(12) United States Patent
Schroeder et al.

(10) Patent No.: US 9,252,670 B2
(45) Date of Patent: Feb. 2, 2016

(54) MULTILEVEL CONVERTER

(71) Applicant: General Electric Company, Schenectady, NY (US)

(72) Inventors: Stefan Schroeder, Munich (DE); Jie Shen, Unterföhring (DE); Samir Soua, Antony (FR)

(73) Assignee: General Electric Company, Niskayuna, NY (US)

( * ) Notice: Subject to any disclaimer, the term of this patent is extended or adjusted under 35 U.S.C. 154(b) by 243 days.

(21) Appl. No.: 13/719,259

(22) Filed: Dec. 19, 2012

(65) Prior Publication Data

US 2014/0169040 A1    Jun. 19, 2014

(51) Int. Cl.
| | |
|---|---|
| H02M 3/335 | (2006.01) |
| H02M 7/537 | (2006.01) |
| H02M 7/521 | (2006.01) |
| H02M 7/483 | (2007.01) |
| H02M 7/487 | (2007.01) |

(52) U.S. Cl.
CPC .......... *H02M 3/33507* (2013.01); *H02M 3/335* (2013.01); *H02M 7/483* (2013.01); *H02M 7/521* (2013.01); *H02M 7/537* (2013.01); *H02M 7/487* (2013.01); *H02M 2007/4835* (2013.01)

(58) Field of Classification Search
CPC .................................................. H02M 3/33507
USPC ............... 363/123, 131, 65, 135, 138, 57, 98, 363/132, 136, 137; 323/223, 237, 217
See application file for complete search history.

(56) References Cited

U.S. PATENT DOCUMENTS

| | | | |
|---|---|---|---|
| 6,058,031 | A | 5/2000 | Lyons et al. |
| 6,278,626 | B1 * | 8/2001 | Teichmann ................... 363/135 |
| 6,697,271 | B2 | 2/2004 | Corzine |
| 6,969,967 | B2 | 11/2005 | Su |
| 7,292,460 | B2 | 11/2007 | Barbosa et al. |

(Continued)

FOREIGN PATENT DOCUMENTS

| | | |
|---|---|---|
| EP | 0660498 A2 | 6/1995 |
| EP | 2226926 A1 | 9/2010 |

OTHER PUBLICATIONS

Livid Mihalache et al.; A New Three-Phase Hybrid Five-Level Inverter with Reduced Number of High-Frequency Switching Devices; Energy Conversion Congress and Exposition (ECCE), 2011 IEEE; pp. 3720-3727.

(Continued)

*Primary Examiner* — Jeffrey Gblende
*Assistant Examiner* — Trinh Dang
(74) *Attorney, Agent, or Firm* — Seema S. Katragadda

(57) ABSTRACT

A power converter is presented. The power converter includes at least one leg operatively coupled between a first bus and a second bus and includes a first string including a plurality of non-controllable semiconductor switches, a first node, a second node, and a third node, where the first node is coupled to a third bus, one or more second strings, where each of the one or more second strings includes at least one fully controllable semiconductor switch, and where one of the second strings is coupled between the first node and the third bus and another second string is coupled between the second node and the third node, and one or more third strings, where each of the one or more third strings includes at least one energy storage device and is coupled to the first string, the one or more second strings, or a combination thereof.

21 Claims, 12 Drawing Sheets

(56) References Cited

U.S. PATENT DOCUMENTS

| | | |
|---|---|---|
| 7,313,008 B2 | 12/2007 | Steimer |
| 7,319,313 B2 | 1/2008 | Dickerson et al. |
| 7,440,300 B2 | 10/2008 | Konishi et al. |
| 7,800,926 B2 | 9/2010 | Benaboud et al. |
| 2007/0096701 A1* | 5/2007 | Steimer .................. 323/237 |
| 2007/0230226 A1* | 10/2007 | Lai et al. .................. 363/65 |
| 2009/0316458 A1 | 12/2009 | Gonzalez Senosiain et al. |
| 2010/0141041 A1 | 6/2010 | Bose et al. |
| 2010/0309700 A1* | 12/2010 | Maeda et al. ............. 363/126 |
| 2012/0163057 A1* | 6/2012 | Permuy et al. ............. 363/131 |
| 2013/0106328 A1* | 5/2013 | Kopiness et al. ........ 318/400.11 |

OTHER PUBLICATIONS

K.A. Corzine et al.; Reduced Parts-Count Multi-Level Rectifiers; Industrial Electronics, IEEE Transactions; Aug. 2002; vol. 49 , Issue: 4; pp. 766-774.

Brendan Peter McGrath et al.; Optimal Modulation of Flying Capacitor and Stacked Multicell Converters Using a State Machine Decoder; IEEE Transactions on Power Electronics, vol. 22, No. 2, Mar. 2007; pp. 508-516.

\* cited by examiner

MULTILEVEL CONVERTER

BACKGROUND

Embodiments of the present disclosure generally relate to multilevel converters and more specifically to a multilevel converter realized with a reduced number of fully controllable semiconductor switches.

As will be appreciated, a converter is employed to convert one form of power to another form. The introduction of three-level converters led to the advent of multilevel converters. Subsequently, several multilevel converter topologies were developed. The concept of a multilevel converter was established to achieve higher power via use of a series of semiconductor switches with several lower voltage direct current (DC) sources to perform power conversion by synthesizing a staircase voltage waveform. Capacitors, batteries, and renewable energy voltage sources can be used as the DC voltage sources. The multilevel converter offers several advantages over a conventional two-level converter that uses high switching frequency pulse width modulation (PWM). Furthermore, the multilevel converters are typically suitable for medium to high power applications. In recent times due to an increased number of high power applications, there is an increased demand for multilevel converters.

Conventionally, the multilevel converters typically include only fully controllable semiconductor switches. However, the use of the fully controllable semiconductor switches increases the cost of the converter because of the high cost of the fully controllable semiconductor switches. Another alternative converter is a diode rectifier which employs only diodes. Although, the diode rectifier is low in cost, the diode rectifier produces output waveforms with high distortion.

BRIEF DESCRIPTION

In accordance with aspects of the present disclosure a power converter is presented. The power converter includes at least one leg operatively coupled between a first bus and a second bus, where the at least one leg includes a first string including a plurality of non-controllable semiconductor switches, a first node, a second node, and a third node, where the first node is coupled to a third bus. The at least on leg also includes one or more second strings, where each of the one or more second strings includes at least one fully controllable semiconductor switch, and where one of the second strings is operatively coupled between the first node and the third bus and another second string is operatively coupled between the second node and the third node. Moreover, the at least one leg includes and one or more third strings, where each of the one or more third strings includes at least one energy storage device, and where each of the one or more third strings is operatively coupled to the first string, the one or more second strings, or a combination thereof.

In accordance with another aspect of the present disclosure, a system for power conversion is presented. The system includes a first power converter. Moreover, the system includes a direct current link operatively coupled to the first power converter and including one or more direct current link capacitors operatively coupled in series. In addition, the system includes a second power converter operatively coupled to the first power converter via a first bus and a second bus, where the second power converter includes at least one leg operatively coupled between the first bus and the second bus, where the at least one leg includes a first string including a plurality of non-controllable semiconductor switches, one or more second strings, where each of the one or more second strings includes at least one fully controllable semiconductor switch, and one or more third strings, where each of the one or more third strings includes at least one energy storage device, and where each of the one or more third strings is operatively coupled to the first string, the one or more second strings, or a combination thereof. Also, the system includes a pre-charging unit configured to charge the at least one energy storage device in the one or more third strings and the one or more direct current link capacitors in the direct current link.

In accordance with yet another aspect of the present disclosure, a method for power conversion is presented. The method includes pre-charging a direct current link capacitor and at least one energy storage device of a power converter during an initial state of the power converter, where the power converter includes at least one leg operatively coupled between a first bus and a second bus, where the at least one leg includes a first string including a plurality of non-controllable semiconductor switches, one or more second strings, where each of the one or more second strings includes at least one fully controllable semiconductor switch, and one or more third strings, where each of the one or more third strings includes the at least one energy storage device, and where each of the one or more third strings is operatively coupled to the first string, the one or more second strings, or a combination thereof. Also, the method includes operatively coupling the power converter to a grid. Moreover, the method includes selectively switching the at least one fully controllable semiconductor switch in the one or more second strings of the power converter. Additionally, the method includes generating a multilevel voltage based on the selective switching of the at least one fully controllable semiconductor switch.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary multilevel power converter and method for power conversion are presented. In one example, the multilevel power converter may include a five level power converter with a reduced count of fully controllable semiconductor switches. The term multilevel power converter, as used herein, is representative of a converter that converts one form of an input voltage/current to another form of an output voltage/current, where the output voltage/current includes multiple levels and has minimal distortion.

Figure 1:
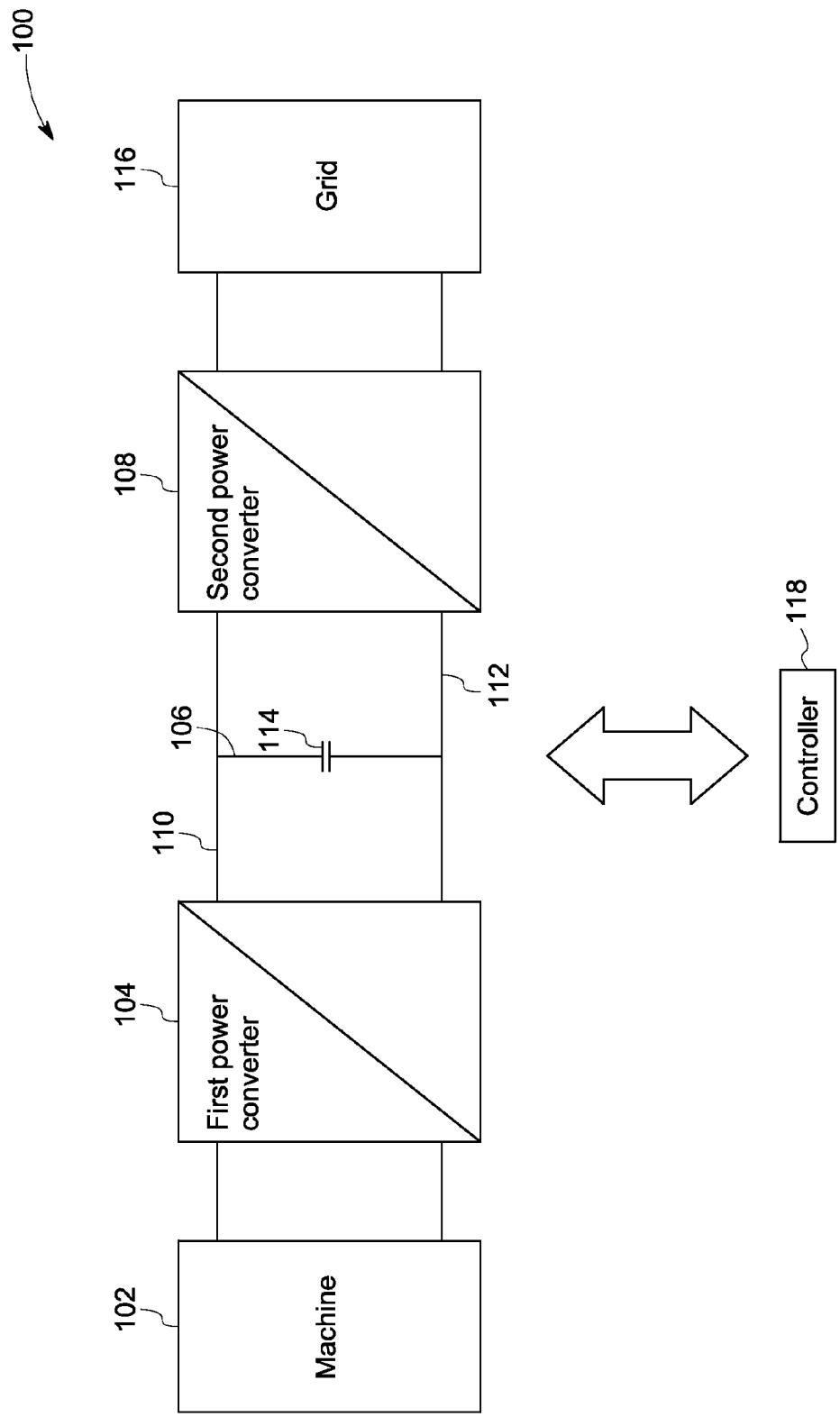
FIG. 1 is a diagrammatical representation of a system for power conversion.

Turning now to the drawings, and referring to FIG. 1, a diagrammatical representation of a system 100 for power conversion, is depicted. The system for power conversion 100 may include a machine 102. The machine 102 may include an electrical motor, an electrical generator, and the like. Furthermore, the machine 102 may be operatively coupled to a first power converter 104. The first power converter 104 may be operatively coupled via a direct current (DC) link 106 to a second power converter 108. The first power converter 104 may also be operatively coupled to the second power converter 108 using a first bus 110 and a second bus 112. In one example, the first power converter 104 may include an alternating current (AC) to direct current converter (DC), a DC to AC current converter, or a combination thereof. Moreover, the first power converter 104 may include a plurality of fully controllable semiconductor switches, in one example.

Also, the DC link 106 may include a DC link capacitor 114. In another embodiment, the DC link 106 may include a plurality of DC link capacitors. The second power converter 108 may include an AC to DC converter. In accordance with aspects of the present disclosure, the second power converter 108 may include a combination of a plurality of fully controllable semiconductor switches, a plurality of non-controllable semiconductor switches, and an energy storage device. Moreover, the second power converter 108 may be operatively coupled to a grid 116. In one example, a direction of flow of power is from the grid 116 to the machine 102. The term operatively coupled, as used herein, may include wired coupling, wireless coupling, electrical coupling, magnetic coupling, radio communication, software based communication, or combinations thereof. Furthermore, the coupling may also be achieved by employing an AC bus, a DC bus, and the like.

In accordance with aspects of the present disclosure, an exemplary power converter is presented. In one example, the exemplary power converter may be employed on a grid side of the power conversion system 100. The second power converter 108 may include at least one leg, in one embodiment. The leg may be associated with at least one alternating current phase. The term alternating current phase, as used herein, may include an AC phase A, an AC phase B, or an AC phase C. Moreover, in one example, when the second power converter 108 is an AC to DC converter, the AC phase may serve as an input terminal and the DC link 106 may serve as an output terminal.

Furthermore, in one embodiment, the leg may include a first string, one or more second strings, and one or more third strings. The first string may include a plurality of non-controllable semiconductor switches. In one non-limiting example, the non-controllable semiconductor switches may include a power diode. The term power diode, as used herein, may be used to refer to a silicon based switch, a silicon carbide based switch, a gallium nitride based switch, a gallium arsenide based switch, and the like. Moreover, the first string may include a first node, a second node, and a third node. In one example, the one or more second strings may be operatively coupled between the second node and the third node of the first string.

In addition, the one or more second strings may include at least one fully controllable semiconductor switch. Also, the one or more third strings may include at least one energy storage device. Additionally, in one example, the fully controllable semiconductor switch may include an insulated gate bipolar transistor, a metal oxide semiconductor field effect transistor, a field effect transistor, an injection enhanced gate transistor (IEGT), an integrated gate commutated thyristor (IGCT), a gallium nitride based switch, a gallium arsenide based switch, a silicon carbide based switch, and the like.

Furthermore, the second power converter 108 may include a five level power converter, a seven level power converter, a nine level power converter, or other equivalent multilevel power converters. In one non-limiting example, the first power converter 104 may have a topology that is substantially similar to the topology of the second power converter 108.

Moreover, the system 100 may include a controller 118 configured to control switching of the fully controllable semiconductor switches of the one or more second strings. This switching of the fully controllable semiconductor switches aids in regulating the generation of the multilevel voltage and pre-charging of the second power converter 108. Accordingly, at least one fully controllable semiconductor switch of the one or more second strings may be configured to be selectively switched to provide a current traverse path. The current traverse path may include a path through one or more of the first string, the one or more second strings, the one or more third strings, and the direct current link 106. The second power converter 108 will be explained in greater detail with reference to FIGS. 2-12. Also, the method for power conversion using the multilevel power converter of FIG. 1 will be explained in greater detail with reference to FIGS. 3-4, 8-11, and 12.

Figure 2:
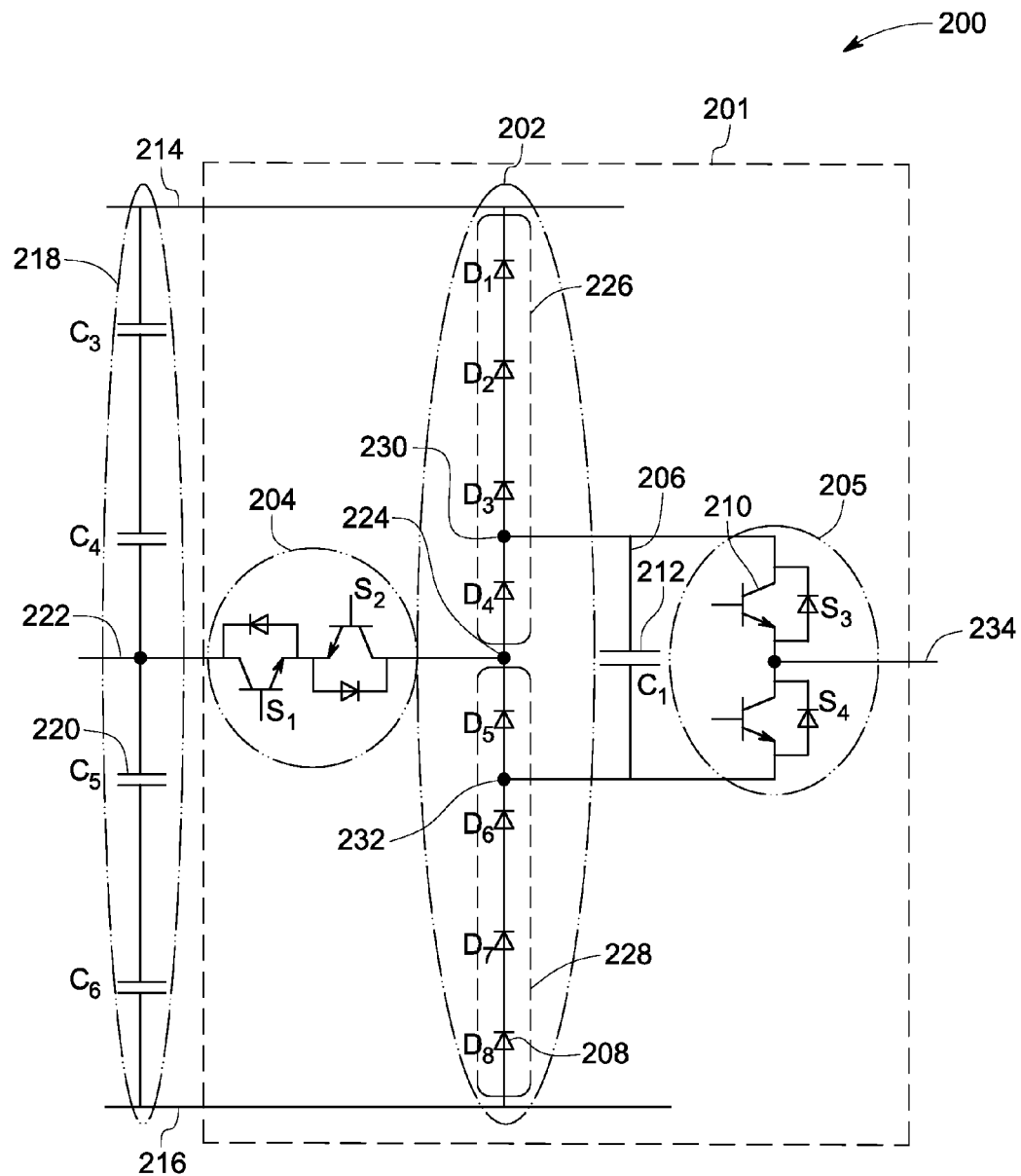
FIG. 2 is a diagrammatical representation of an exemplary embodiment of a portion of a power converter for use in the system of FIG. 1, according to aspects of the present disclosure.

Referring now to FIG. 2, a diagrammatical representation 200 of a portion of a power converter for use in the system 100 of FIG. 1, is presented. More particularly, FIG. 2 is a diagrammatical representation of one leg 201 of the second power converter 108 of FIG. 1.

In the example of FIG. 2, the leg 201 may include a first string 202, two second strings 204, 205, and a third string 206. The first string 202 may include a plurality of non-controllable semiconductor switches 208. By way of example, the non-controllable semiconductor switches 208 may include power diodes. The power diodes in the first string 202 may be represented as $D_1, D_2, D_3, D_4, D_5, D_6, D_7,$ and $D_8$, for ease of understanding. Also, the second strings 204, 205 may include at least one fully controllable semiconductor switch 210. In an alternative embodiment, the second strings 204, 205 may include at least one partially controllable semiconductor switch such as, a thyristor. In yet another embodiment, the second strings 204, 205 may include a combination of at least one partially controllable semiconductor switch and at least one fully controllable semiconductor switch. For ease of representation, the fully controllable semiconductor switches in the second string 204 may be represented as $S_1$ and $S_2$ and the fully controllable semiconductor switches in the second string 205 may be represented as $S_3$ and $S_4$.

Moreover, in one non-limiting example, each fully controllable semiconductor switch 210 may include an insulated gate bipolar transistor (IGBT), a metal-oxide-semiconductor field-effect transistor, a field-effect transistor, an injection enhanced gate transistor (IEGT), an integrated gate commutated thyristor (IGCT), a gallium nitride based switch, a silicon carbide based switch, a gallium arsenide based switch, or combinations thereof. These fully controllable semiconductor switches 210 may also include an inbuilt antiparallel power diode, which may provide a freewheeling path. By way of example, the second strings 204, 205 may include an IGBT along with an antiparallel power diode.

Furthermore, the third string 206 may include an energy storage device 212. The energy storage device 212 may include a capacitor. This capacitor may also be referred to as a flying capacitor. For ease of representation, the energy storage device 212 may be represented as $C_1$.

The leg 201 may be operatively coupled between a first bus 214 and a second bus 216. The first bus 214 may include a positive DC bus and the second bus 216 may include a negative DC bus. In addition, a DC link 218 may be operatively coupled between the first bus 214 and the second bus 216. Accordingly, the DC link 218 may be operatively coupled in parallel to the leg 201. The DC link 218 may form a DC terminal of the power converter. In the example of FIG. 2, the DC link 218 may include four DC link capacitors 220. These four DC link capacitors 220 may be represented as $C_3, C_4, C_5,$ and $C_6$, for ease of representation. Reference numeral 222 may be representative of a third bus coupled to the DC link 218. In one embodiment, reference numeral 222 may be representative of the middle point of the DC link 218. The term third bus, as used herein, may be a middle DC bus. In one non-limiting example, the voltage at the middle DC bus may be zero volt.

Additionally, the first string 202 may include a first portion 226 operatively coupled to a second portion 228 via a first node 224. The first string 202 may also include a second node 230 and a third node 232. In one non-limiting example, the first node 224 may be a middle point of the first string 202. The first node 224 may be operatively coupled to the third bus 222. More particularly, in the example of FIG. 2, the first node 224 is operatively coupled to the middle DC bus 222 via the second string 204. Furthermore, the other second string 205 may be operatively coupled in parallel to the third string 206. This third string 206 may be operatively coupled across the second node 230 and the third node 232. Also, the second string 205 may be operatively coupled to a fourth bus 234. The term fourth bus, as used herein, may be representative of an alternating current phase such as AC phase A, AC phase B, and AC phase C. The AC phases form an AC terminal of the power converter. It may be noted that the example of FIG. 2 represents one leg 201 associated with one AC phase.

As noted hereinabove, the leg 201 utilizes a combination of non-controllable semiconductor switches and fully controllable semiconductor switches. Consequently, the leg 201 of the power converter utilizes a reduced count of fully controllable semiconductor switches when compared to a leg of presently available conventional power converters, thereby providing a low cost power converter.

Furthermore, FIG. 2 depicts a topology of a five level power converter. The term five level power converter, as used herein, may be representative of a power converter which generates five levels of voltage at the fourth bus 234. Also, in one embodiment, the number of second strings, the number of third strings, the number of non-controllable semiconductor switches in the first string, and the number of fully controllable switches in the second strings may vary based on a desired number of levels of voltages to be generated.

Figure 3:
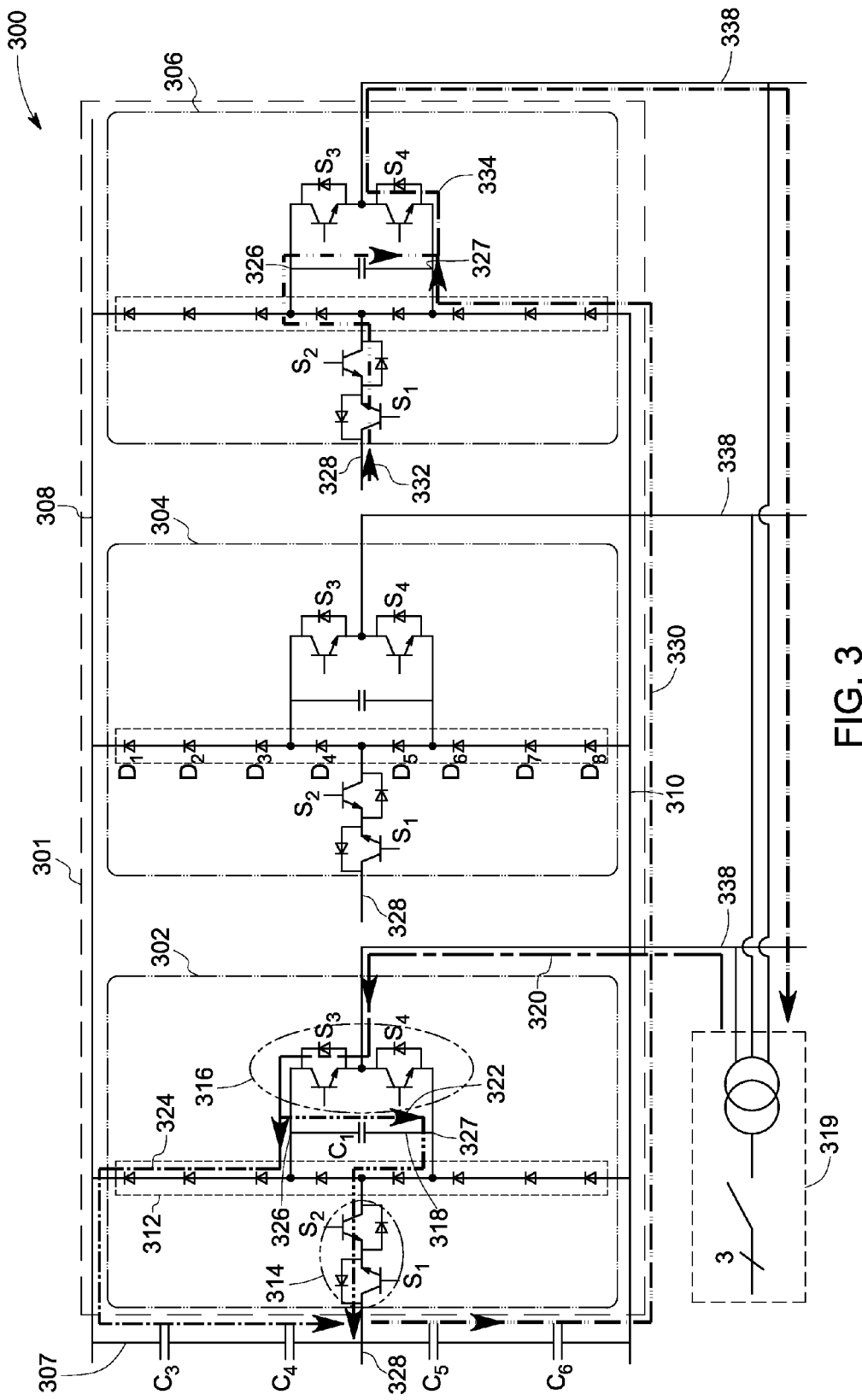
FIGS. 3 and 4 are diagrammatical representations of an exemplary method of pre-charging, according to aspects of the present disclosure.
Figure 4:
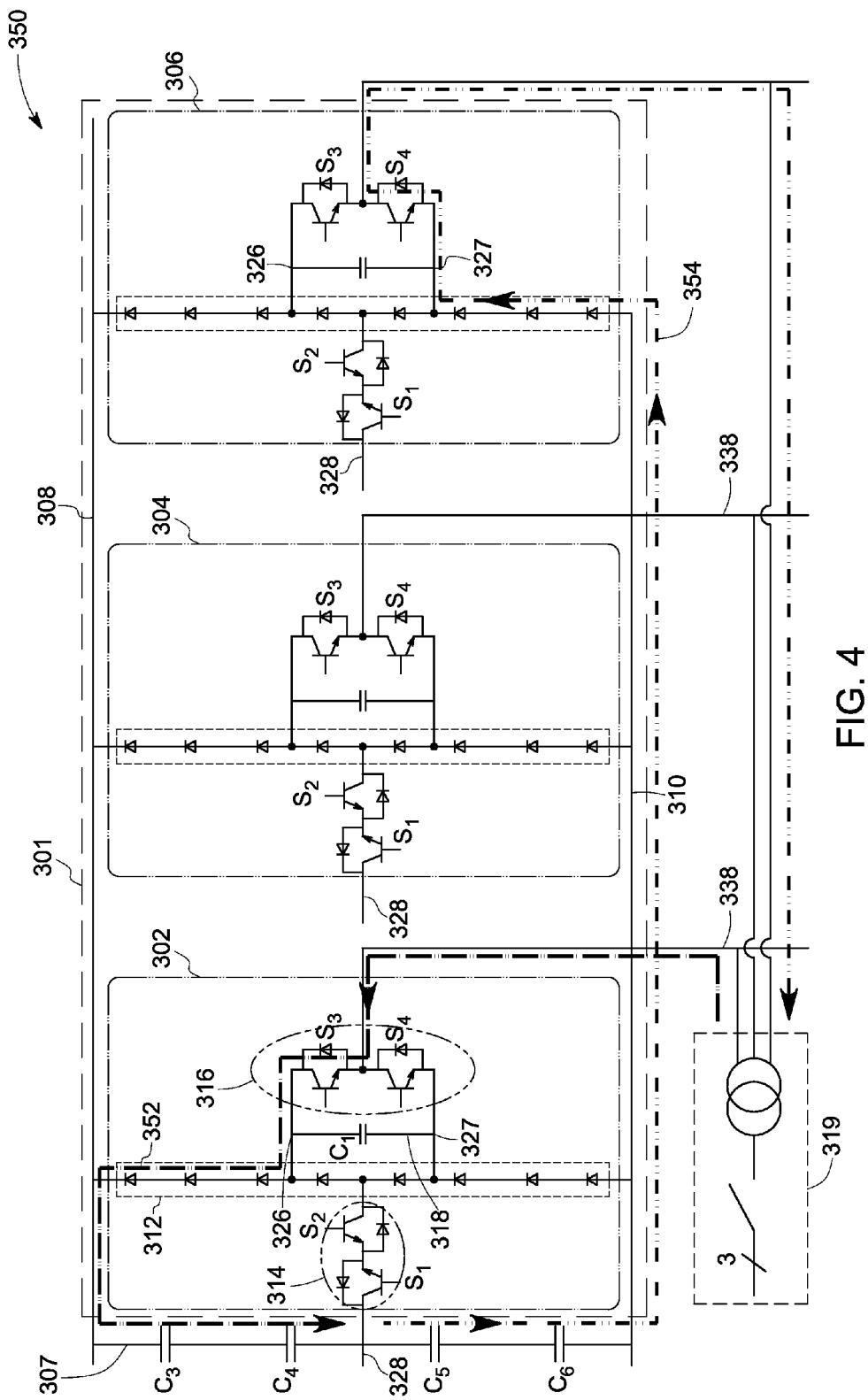

FIGS. 3 and 4 are diagrammatical representations of an exemplary method of pre-charging, according to aspects of the present disclosure, is presented. Particularly, FIGS. 3 and 4 respectively depict a first stage and a second stage of pre-charging of the DC link capacitors and the flying capacitors of the power converter. It may be noted that pre-charging may include a method of charging the DC link capacitors and the flying capacitors of the power converter before the power converter is operatively coupled to the grid, such as the grid 116 of FIG. 1.

The portion of the power converter 301 depicted in FIG. 3 is illustrated including three legs 302, 304, 306. In one embodiment, the three legs 302, 304, 306 of the power converter 301 may include a leg 201 represented in FIG. 2. Each of the three legs 302, 304, 306 corresponds to one alternating current phase. Moreover, each leg 302, 304, 306, may include a first string 312, two second strings 314, 316, and a third string 318. The first string 312 includes a plurality of non-controllable semiconductor switches represented as $D_1, D_2, D_3, D_4, D_5, D_6, D_7,$ and $D_8$. Also, the second string 314 includes two fully controllable semiconductor switches, represented as $S_1$ and $S_2$. The other second string 316 includes two fully controllable semiconductor switches, represented as $S_3$ and $S_4$. Furthermore, the third string 318 includes a flying capacitor, represented as $C_1$.

Reference numeral 307 may be representative of a DC link having DC link capacitors $C_3, C_4, C_5, C_6$. Prior to the first stage of pre-charging depicted in FIG. 3, it may be assumed that the flying capacitor $C_1$ and each capacitor $C_3, C_4, C_5, C_6$ of the DC link 307 are in a discharged condition (zero volt). Also, at this stage the power converter 301 may not be operatively coupled to the grid. As previously noted, the three legs 302, 304, and 306 of the power converter 301 are associated with at least one alternating current phase such as AC phase A, AC phase B and AC phase C. Hence, in one example, at any instant in time, one of the AC phases may be at a highest value of voltage (for example, most positive voltage) and another AC phase may be at the lowest value of voltage (for example, most negative voltage). In one non-limiting example, the AC phase A may be at the highest value of voltage and the AC phase C may be at the lowest value of voltage at a given instant in time. Also, the leg 302 may be associated with AC phase A, the leg 304 may be associated with AC phase B, and the leg 306 may be associated with AC phase C. The leg associated with the AC phase that corresponds to the highest value of voltage may provide a current conduction path for a charging current and the leg associated with the AC phase that corresponds to the lowest value of voltage may provide a return path for the charging current. Hence, the flying capacitor $C_1$ in the leg associated with the AC phase having the highest value of voltage may be charged to 1 pu. In a similar fashion, the flying capacitors of the other legs associated with the other AC phases may also be charged to 1 pu when the AC phases corresponding to the other legs have highest value of voltage.

Turning now to FIG. 3, a first stage 300 of pre-charging of the flying capacitors in the power converter 301 and the DC link capacitors is depicted. In particularly, as depicted in FIG. 3, the system 300 may include a pre-charging unit 319 configured to charge the flying capacitors in the power converter 301 and the DC link capacitors, before the power converter 301 is operatively coupled to the grid. Furthermore, in the first stage 300, the switches $S_1$ and $S_2$ are activated and the switches $S_3$ and $S_4$ are maintained in a deactivated condition. Accordingly, the charging current may traverse one or more paths generally represented by reference numerals 320, 322, and 324. More particularly, in the current conduction path 320, the charging current flows from the pre-charging unit 319 to a first point 326 of the leg 302 while traversing through the corresponding fourth bus 338 and anti-parallel diode corresponding to switch $S_3$.

Once the charging current arrives at the first point 326 of the leg 302, the charging current diverges into two different current conduction paths 322 and 324. Particularly, in the current conduction path 322, the charging current flows from the first point 326 to a middle DC bus 328 via the capacitor $C_1$, a second point 327, diode $D_5$ of the leg 302 and the activated switches $S_1$ and $S_2$ of the leg 302. In one embodiment, in the current conduction path 322, the current flows from the first point 326 to the middle DC bus 328 via the capacitor $C_1$, the second point 327, the diode $D_5$ of the leg 302, the anti-parallel diode corresponding to the switch $S_1$, and the activated switch $S_2$ of the leg 302. Also, in the current conduction path 324, the charging current traverses a path from the first point 326 to the middle bus 328 while traversing the diodes $D_3$, $D_2$, $D_1$ of the leg 302, a first bus 308, and DC link capacitors $C_3$ and $C_4$.

Furthermore, one or more return paths for the charging current may be provided by return paths 330, 332, 334. More particularly, in the return path 330, the charging current traverses from the middle DC bus 328 through DC link capacitors $C_5$ and $C_6$ to the second point 327 of the leg 306 via a second bus 310. Also, in the return path 332, the charging current traverses a path from the middle DC bus 328 to the second point 327 of the leg 306 via activated switches $S_1$ and $S_2$, diode $D_4$, first point 326, and capacitor $C_1$ of the leg 306. In one example, in the return path 332, the charging current traverses from the middle DC bus 328 to the second point 327 via the activated switch $S_1$, the anti-parallel diode corresponding to the switch $S_2$, the diode $D_4$, the first point 326, and the capacitor $C_1$ of the leg 306.

It may be noted that one end of the second strings 314 of each of the three legs 302, 304, and 306 may be operatively coupled to the common middle DC bus 328. At the second point 327 of the leg 306, the current flowing in the return paths 330 and 332 converge and continue to flow through the return path 334. Particularly, in the current conduction path 334, the current flows from the second point 327 to the pre-charging unit 319 via an anti-parallel diode corresponding to switch $S_4$ and the fourth bus 338 corresponding to the leg 306.

Consequently, during the first stage of pre-charging, the DC link capacitors $C_3$ and $C_4$ and the flying capacitor $C_1$ of the leg 302, and the DC link capacitors $C_5$ and $C_6$ and the flying capacitor $C_1$ of leg 306 may be charged. The instant at which the flying capacitor $C_1$ of the leg 302 is charged to a first determined value of the DC link voltage, the DC link capacitors $C_3$ and $C_4$ may also be charged cumulatively to the first determined value of DC link voltage.

In one example, the first determined value of DC link voltage may be substantially equal to one half of the full value of DC link voltage. If it is assumed that the full value of DC link voltage is 2 pu, the first determined value of DC link voltage may be 1 pu. Once the flying capacitor $C_1$ of the leg 302 is charged to the first determined value of DC link voltage, the switches $S_1$ and $S_2$ are deactivated. Accordingly, the flying capacitor $C_1$ of the leg 302 and the DC link capacitors $C_3$ and $C_4$ may be cumulatively charged to 1 pu. Similarly, the DC link capacitors $C_5$ and $C_6$ and the flying capacitor $C_1$ of leg 306 may be charged to 1 pu when the return path of the charging current traverses through the leg 306. In a similar fashion, the flying capacitors $C_1$ associated with the leg 304 may be charged to the first determined value. Furthermore, in one example, the flying capacitors $C_1$ associated with legs 302, 304, and 306 may be charged to the first determined value in a random fashion. Moreover, the flying capacitors $C_1$ associated with legs 302, 304, and 306 may be charged to the first determined value in multiple cycles of an AC current. In one non-limiting example, the AC current may be representative of a grid current. Also, in one example, the DC link capacitors $C_3$, $C_4$, $C_5$ and $C_6$ may be charged in a random manner.

FIG. 4 represents a second stage 350 of pre-charging of the DC link capacitors of the power converter 301. In the second stage 350, all the switches $S_1$, $S_2$, $S_3$, and $S_4$ of the leg 302 are deactivated. During this stage, a charging current may traverse a conduction path 352. In the conduction path 352, the charging current flows from the pre-charging unit 319 to the middle DC bus 328 while traversing the fourth bus 338 corresponding to the leg 302, an antiparallel diode corresponding to switch $S_3$ of the leg 302, diodes $D_3$, $D_2$, $D_1$ of the leg 302, the first bus 308, and the DC link capacitors $C_3$ and $C_4$. Subsequently, the DC link capacitors $C_3$ and $C_4$ may be cumulatively charged to a second determined value of DC link voltage. In the example of FIG. 4, the second determined value of DC link voltage may be a full value of the DC link voltage. If it is assumed that the full value of DC link voltage is 2 pu, the second determined value of the DC link voltage may be 2 pu.

Reference numeral 354 is representative of a return path for the charging current. More particularly, in the return path 354, the charging current passes from the middle bus 328 to the pre-charging unit 319 via the DC link capacitors $C_5$ and $C_6$, the second bus 310, the diodes $D_8$, $D_7$, $D_6$ of the leg 306, the second point 327 of the leg 306, and the antiparallel diode corresponding to the switch $S_4$ of the leg 306. Consequently, each of the DC link capacitors $C_5$ and $C_6$ may be charged to 1 pu. Accordingly, a voltage of −2 pu may be cumulatively generated between the negative DC bus 310 and the middle DC bus 328.

After the first stage and second stage of pre-charging of the DC-link capacitors and the flying capacitors of the power converter 301, it may be assumed that the flying capacitor $C_1$ and each capacitor $C_3$, $C_4$, $C_5$, $C_6$ of the DC link 307 are charged to 1 pu, where pu is representative of per unit. Accordingly, the voltage at the middle DC bus 328 may be considered as 0 pu. Also, voltage across an upper DC link is +2 pu and voltage across a lower DC link is −2 pu. The upper DC link is representative of the portion of the DC link between a first bus 308 and the middle DC bus 328, while the lower DC link is representative of the portion of the DC link between the middle DC bus 328 and a second bus 310. After the DC link capacitors and the flying capacitors of the power converter 301 are pre-charged during the first stage 300 and the second stage 350 of pre-charging, the power converter 301 may be operatively coupled to the grid, such as the grid 116 of FIG. 1.

Figure 5:
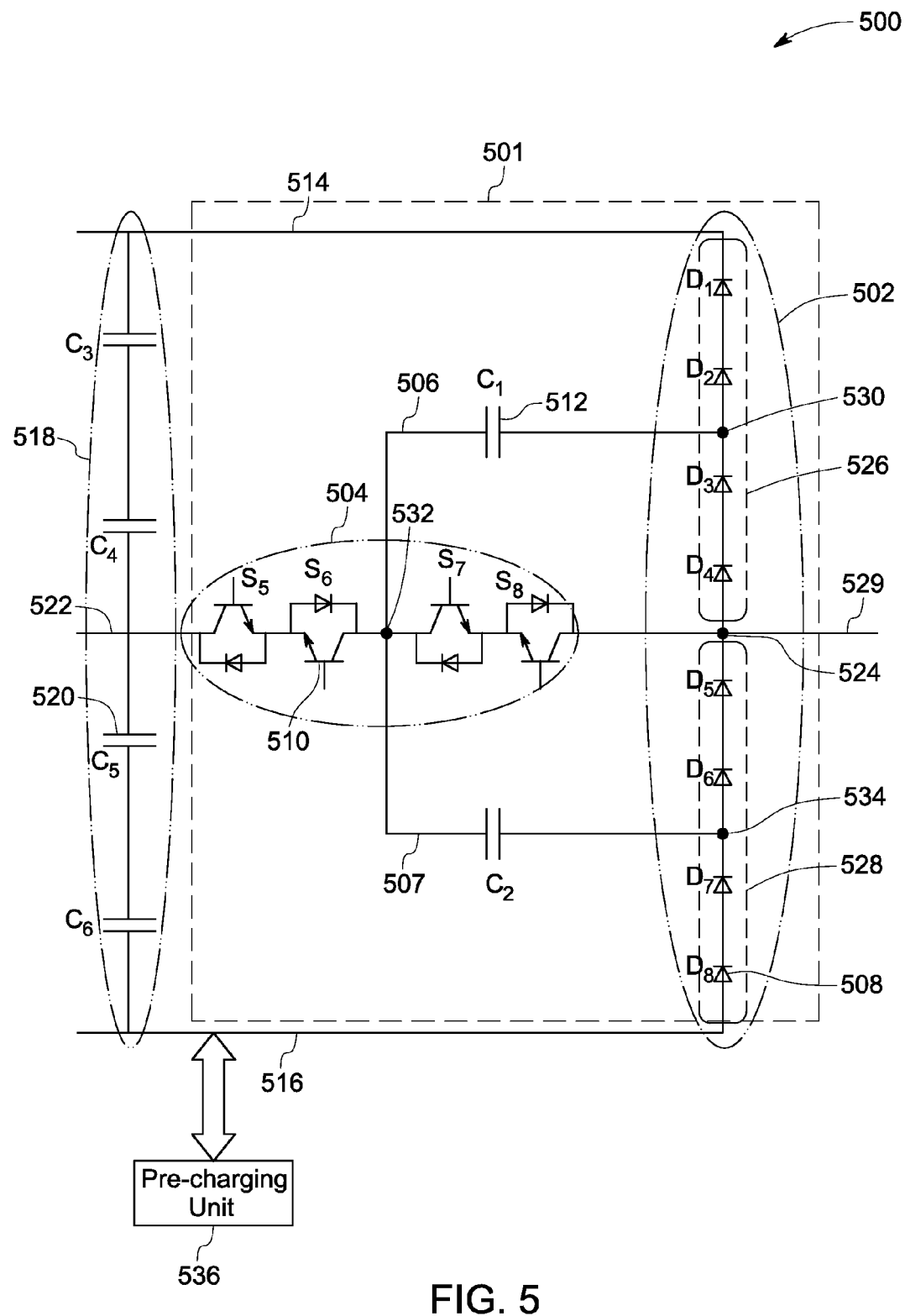
FIG. 5 is a diagrammatical representation of another embodiment of a portion of a power converter with a pre-charging unit for use in the system of FIG. 1, according to aspects of the present disclosure.

Referring now to FIG. 5, a diagrammatical representation 500 of another embodiment of a portion of a power converter with a pre-charging unit for use in the system of FIG. 1, according to aspects of the present disclosure, is presented. More particularly, FIG. 5 is a diagrammatical representation 500 of one leg 501 of the second power converter 108 of FIG. 1 and a pre-charging unit 536, such as the pre-charging unit 319 of FIGS. 3-4. In one embodiment, the leg 501 of FIG. 5 may be used in lieu of the legs 302, 304, and 306 of the power converter 301 of FIGS. 3-4.

In the example of FIG. 5, the leg 501 of the power converter may include a first string 502, a second string 504, and two third strings 506, 507. The first string 502 may include a plurality of non-controllable semiconductor switches 508 represented as $D_1, D_2, D_3, D_4, D_5, D_6, D_7$, and $D_8$, for ease of understanding. Also, the second string 504 may include a plurality of fully controllable semiconductor switches 510. For ease of representation, in the example of FIG. 5, the fully controllable semiconductor switches 510 may be represented as $S_5, S_6, S_7$, and $S_8$.

Additionally, the two third strings 506, 507 may include an energy storage device 512. The energy storage device 512 may include a capacitor, in one example. For ease of representation, the energy storage devices 512 corresponding to the third strings 506, 507 may be respectively represented as $C_1$ and $C_2$. The energy storage devices 512 may also be referred to as flying capacitors.

Moreover, the leg 501 of the power converter may be operatively coupled between a first bus 514 and a second bus 516. In the example of FIG. 5, a DC link 518 is coupled between the first bus 514 and the second bus 516. Also, the DC link 518 may include four DC link capacitors 520. These four DC link capacitors 520 may be represented as $C_3, C_4, C_5$, and $C_6$. Reference numeral 522 may be representative of a third bus coupled to the DC link 518. Also, the first string 502 of the leg 501 may include a first node 524. Furthermore, the first string 502 may have a first portion 526 operatively coupled to a second portion 528 via the first node 524. The first node 524 may be operatively coupled to the middle DC bus 522 via the second string 504. Furthermore, a fourth bus 529 may be operatively coupled to the first string 502, the second string 504, or both the first string 502 and the second string 504. In the example of FIG. 5, the first string 502 is operatively coupled to the fourth bus 529 via the first node 524. As noted hereinabove, the fourth bus 529 may be representative of an alternating current phase such as AC phase A, AC phase B, and AC phase C.

In addition, the third strings 506, 507 may include two ends that may be operatively coupled to the first string 502, the second strings 504, or both the first string 502 and the second string 504. In the example of FIG. 5, one end of the third string 506 is operatively coupled to the first string 502 at a second node 530 and the other end of this third string 506 may be operatively coupled to the second string 504 at a third node 532. Similarly, one end of the third string 507 may be operatively coupled to the second string 504 at the third node 532 and the other end of the third string 507 may be operatively coupled to the first string 502 at the fourth node 534.

As previously noted with respect to FIGS. 3-4, the pre-charging unit 536 may be used to pre-charge the flying capacitors $C_1$ and $C_2$ of the power converter formed by leg 501 of FIG. 5 and the DC link capacitors $C_3, C_4, C_5$, and $C_6$. Furthermore, the pre-charging the flying capacitors $C_1$ and $C_2$ of the power converter formed by leg 501 of FIG. 5 and the DC link capacitors $C_3, C_4, C_5$, and $C_6$ may be achieved in a first stage and second stage of pre-charging by selectively activating and/or deactivating the switches $S_5, S_6, S_7$, and $S_8$ of the second string 504. In the first stage of pre-charging the switches $S_5, S_6$ may be activated and the switches $S_7, S_8$ may be deactivated. Subsequently, in the second stage of pre-charging the switches $S_5, S_6, S_7$, and $S_8$ may be deactivated. Consequently, each of the flying capacitors $C_1$ and $C_2$ and each of the DC link capacitors $C_3, C_4, C_5$, and $C_6$ may be charged to 1 pu.

Figure 6:
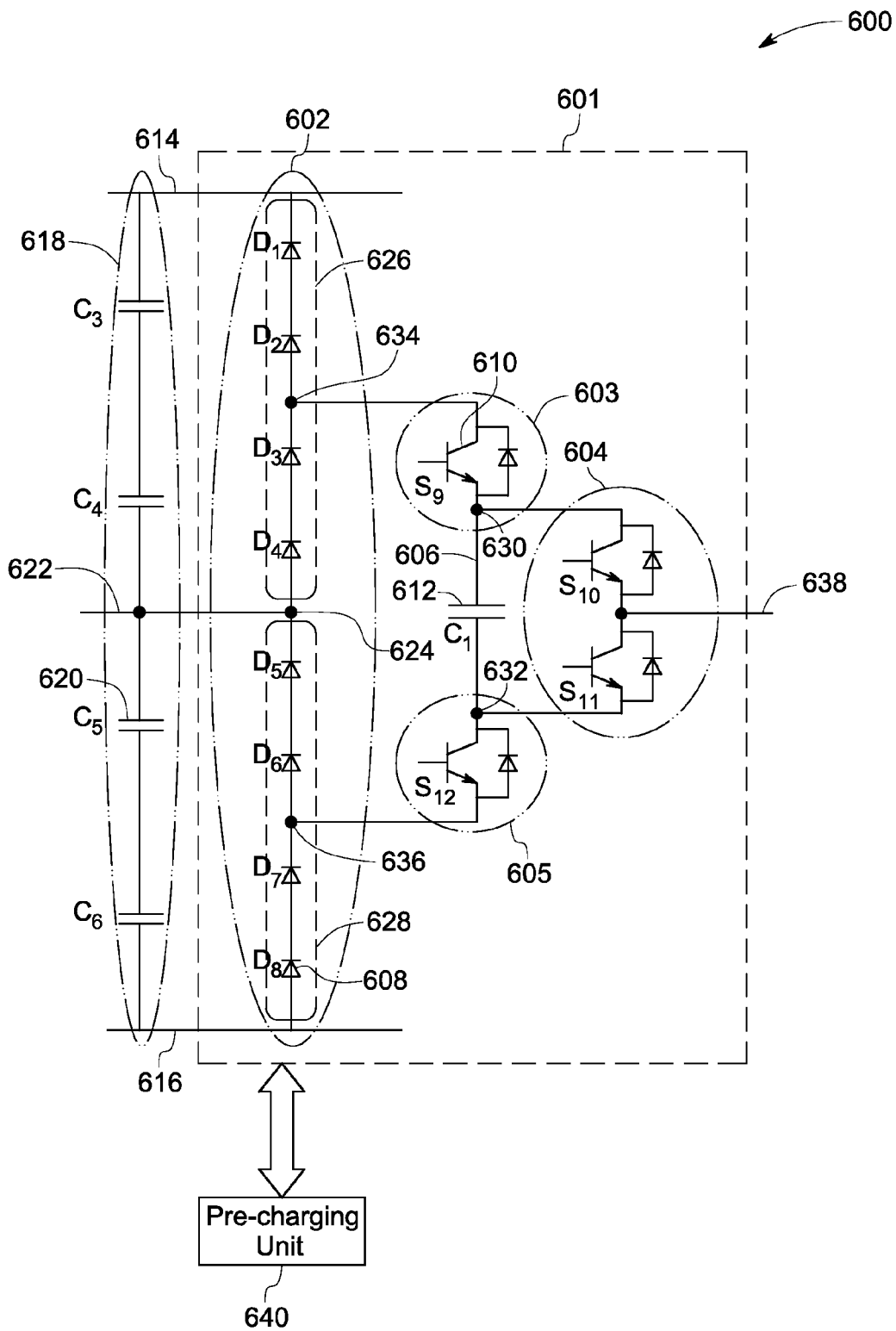
FIG. 6 is a diagrammatical representation of yet another embodiment of a portion of a power converter with a pre-charging unit for use in the system of FIG. 1, according to aspects of the present disclosure.

FIG. 6 is a diagrammatical representation 600 of another embodiment of a portion of a power converter with a pre-charging unit for use in the system of FIG. 1, according to aspects of the present disclosure. In particular, FIG. 6 is a diagrammatical representation 600 of a leg 601 of the second power converter 108 of FIG. 1 with a pre-charging unit 640, such as the pre-charging unit 319 of FIGS. 3-4. In one embodiment, the leg 601 of FIG. 6 may be used to form the legs 302, 304, and 306 of the power converter 301 of FIGS. 3-4.

As depicted in FIG. 6, the leg 601 of the power converter may include a first string 602, three second strings 603, 604, 605, and a third string 606. As previously noted, the first string 602 may include a plurality of non-controllable semiconductor switches 608 operatively coupled in series. Also, the three second strings 603, 604, 605 may include at least one fully controllable semiconductor switch 610. For ease of representation, the fully controllable semiconductor switches in the three second strings 603, 604, 605, may be represented as $S_9, S_{10}, S_{11}$, and $S_{12}$. Furthermore, the third string 606 may include an energy storage device 612. The energy storage device 612 may also be referred to as a flying capacitor. This energy storage device 612 may be represented as $C_1$.

In addition, the leg 601 of the power converter may be operatively coupled across the first bus 614 and the second bus 616. Also, a DC link 618 may be operatively coupled between the first bus 614 and the second bus 616. In the example of FIG. 6, the DC link 618 may include four DC link capacitors 620 represented as $C_3, C_4, C_5$, and $C_6$. The DC link 618 may also be coupled to a third bus 622. Furthermore, the first string 602 may include a first node 624. In FIG. 6, the first string 602 may be operatively coupled to the third bus 622 via the first node 624. Also, the first string 602 may include a first portion 626 operatively coupled to a second portion 628 via the first node 624. In the example of FIG. 6, one end of the third string 606 is operatively coupled to the second string 603 at a second node 630. Also, the other end of the third string 606 may be operatively coupled to another second string 605 at a third node 632. The first string 602 may also include a fourth node 634 and a fifth node 636. Additionally, in the example of FIG. 6, the second string 603 may be operatively coupled between the second node 630 and the fourth node 634. Another second string 604 may be operatively coupled between the second node 630 and the third node 632. Furthermore, yet another second string 605 may be operatively coupled between the third node 632 and the fifth node 636. Also, a fourth bus 638 may be operatively coupled to one of the second strings, such as the second string 604. The fourth bus 638 may be referred to as an alternating current phase.

The flying capacitor $C_1$ of the leg 601 of FIG. 6 and each of the DC link capacitors $C_3, C_4, C_5$, and $C_6$ may be pre-charged via the pre-charging unit 640. In particular, the flying capacitor C1 and the DC link capacitors C3, C4, C5, and C6 may be pre-charged in a manner substantially similar to the pre-charging method described with respect to FIGS. 3-4. The pre-charging may be achieved in two stages of pre-charging by selectively activating and/or deactivating the switches $S_9, S_{10}, S_{11}$, and $S_{12}$ of the second strings 603, 604, 605. Consequently, the flying capacitor $C_1$ and each of the DC link capacitors may be charged to 1 pu.

Figure 7:
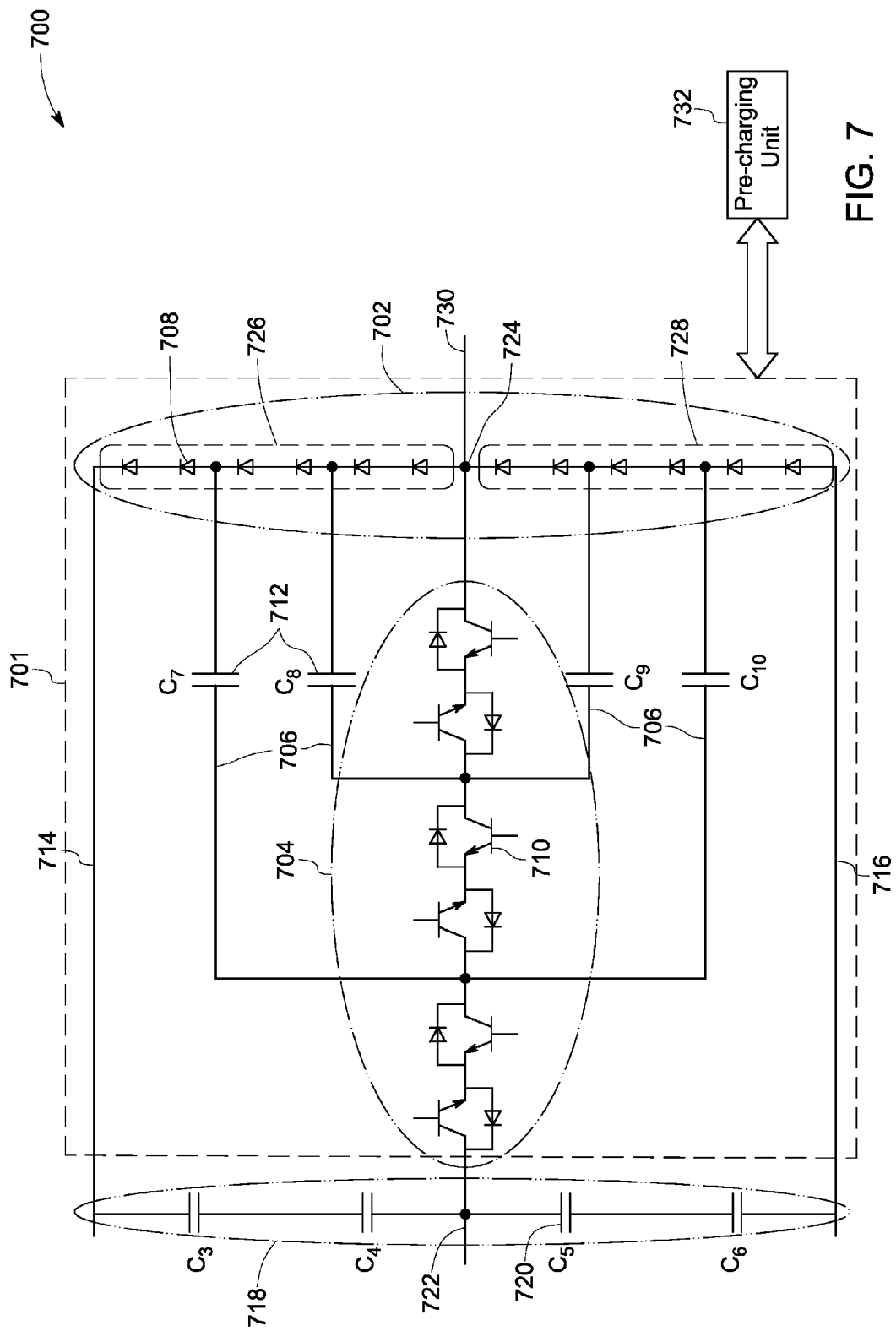
FIG. 7 is a diagrammatical representation of another embodiment of a portion of a power converter with a pre-charging unit for use in the system of FIG. 1, according to aspects of the present disclosure.

FIG. 7 is a diagrammatical representation of yet another embodiment 700 of a portion of a power converter with a pre-charging unit 732 for use in the system of FIG. 1, according to aspects of the present disclosure. More particularly, FIG. 7 is a diagrammatical representation 700 of one leg 701 of the second power converter 108 of FIG. 1 with the pre-charging unit 732, such as the pre-charging unit 319 of FIGS. 3-4. In one embodiment, the leg 701 of FIG. 7 may be employed in lieu of the legs 302, 304, and 306 of the power converter 301 of FIGS. 3-4. The power converter that may be formed using one or more leg 701 of FIG. 7 may be representative of a seven level power converter. The term seven level power converter, as used herein, may be representative of a power converter which generates seven levels of voltages at a fourth bus 730.

In the example of FIG. 7, the leg 701 may include a first string 702, a second string 704, and four third strings 706. Two ends of each of the third strings 706 are operatively coupled to the first string 702, the second string 704, or both the first and second strings 702, 704. The first string 702 may include a plurality of non-controllable semiconductor switches 708. Also, in the example of FIG. 7, the second string 704 is shown as including six fully controllable semiconductor switches 710, operatively coupled in series. Furthermore, each of the third strings 706 may include an energy storage device 712. The energy storage device 712 may also be referred to as a flying capacitor. For ease of representation, the flying capacitors 712 of the FIG. 7 may be represented as $C_7$, $C_8$, $C_9$, and $C_{10}$. The leg 701 may be operatively coupled between a first bus 714 and a second bus 716. Additionally, a DC link 718 may be operatively coupled between the first bus 714 and the second bus 716. Also, the DC link 718 may include six DC link capacitors 720, in the example of FIG. 7. Moreover, the middle point of the DC link 718 may be operatively coupled to a third bus 722. The first string 702 may include a first portion 726 operatively coupled to a second portion 728 via a first node 724. Furthermore, the first string 702 may be operatively coupled to the fourth bus 730.

The pre-charging unit 732 may be configured to pre-charge the flying capacitors of the leg 701 of FIG. 7 and the DC link capacitors. Furthermore, the pre-charging may be achieved in three stages of pre-charging by selectively activating and/or deactivating the six fully controllable semiconductor switches of the second string 704. Consequently, each of the flying capacitors and each of the DC link capacitors of the leg 701 may be charged to a desired value of voltage. In one example, the desired value of voltage may be 1 pu.

Referring to FIGS. 8-11, diagrammatical representations of an exemplary method for power conversion for use in the embodiment of FIG. 2, according to aspects of the present disclosure, are depicted. For ease of understanding the FIGS. 8-11 will be explained with respect to the elements of FIGS. 1 and 2. In particular, the example of FIGS. 8-11 depicts different states of a power converter during the generation of five levels of voltage. The term five levels of voltage, as used herein, may be representative of five levels of voltage generated at the fourth bus 234. For the ease of explanation, it is assumed that the five levels of voltage at the fourth bus 234 are +2 pu, +1 pu, 0 pu, -1 pu, and -2 pu. Accordingly, the different states for generation of +2 pu, +1 pu, 0 pu at the fourth bus are depicted in FIGS. 8-11.

For the ease of explanation of FIGS. 8-11, it may be assumed that the flying capacitor $C_1$ and each capacitor of the DC link ($C_3$, $C_4$, $C_5$, and $C_6$) are charged to 1 pu during an initial state of the power converter such as the second power converter 108 of FIG. 1. The flying capacitor $C_1$ and each capacitor of the DC link ($C_3$, $C_4$, $C_5$, and $C_6$) may be charged during the initial state of the power converter by employing the pre-charging unit 319.

Furthermore, the voltage at the third bus 222 may be as assumed to be 0 pu. Accordingly, a voltage across an upper DC link is +2 pu and a voltage across a lower DC link is -2 pu. As previously noted, the upper DC link is representative of the DC link between the positive DC bus 214 and the middle DC bus 222, and the lower DC link is representative of the DC link between the middle DC bus 222 and the negative DC bus 216. Also, when a positive current flows from the fourth bus 234 to the leg 201 of the power converter, a non-negative voltage is generated at the fourth bus 234. In one embodiment, the non-negative voltage may be a positive voltage and/or a zero voltage.

Figure 8:
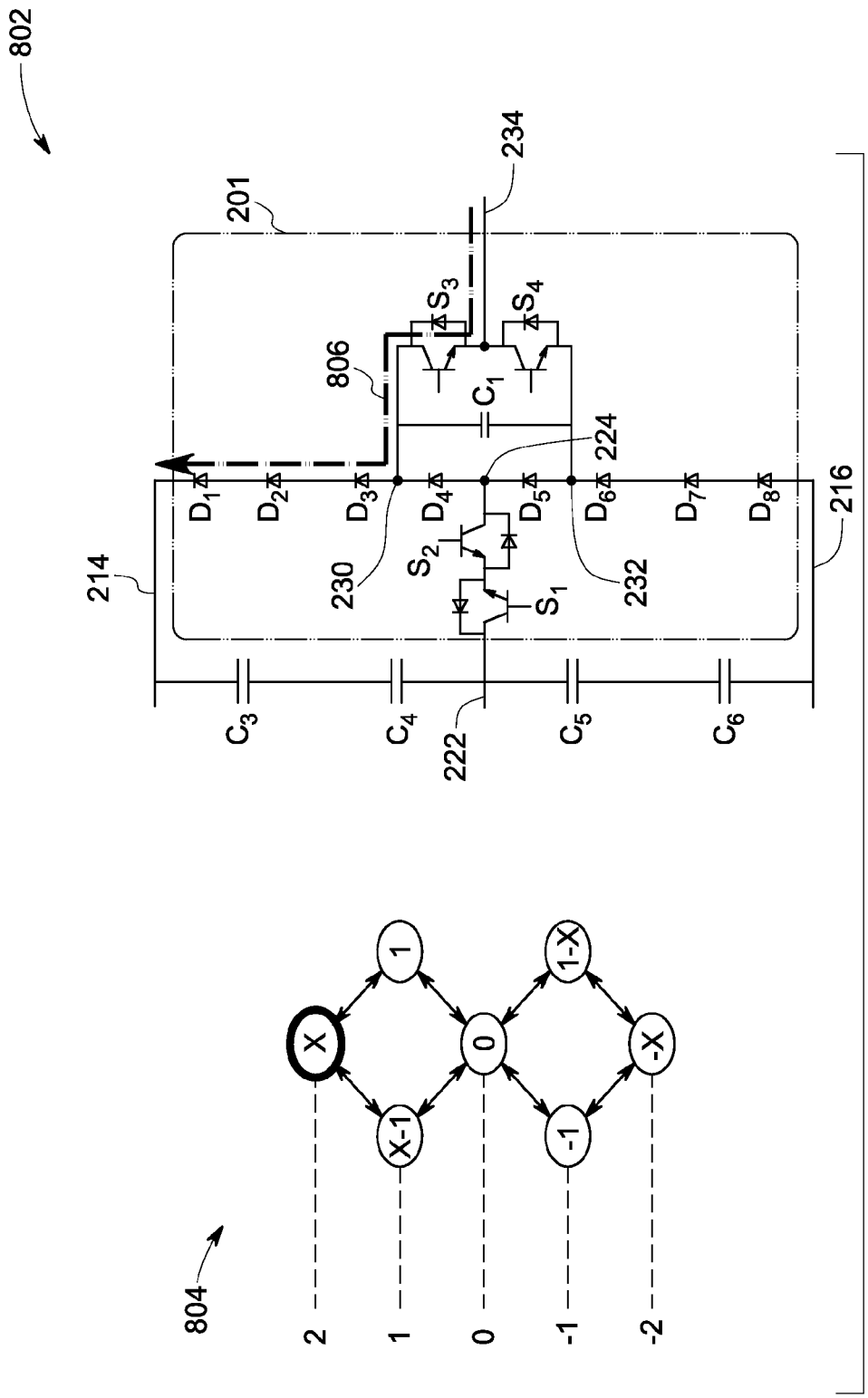
FIGS. 8-11 are diagrammatical representations of a method for power conversion for use in the embodiment of FIG. 2, according to aspects of the present disclosure.

FIG. 8 is a diagrammatical representation 802 of a first state of the legs of the power converter such as the leg 201 of FIG. 2. Reference numeral 804 is representative of a state diagram corresponding to the first state 802 of the leg 201 of the power converter. By way of example, a state 'x' of the state diagram 804 indicates a voltage level of +2 pu. Therefore, for generating the voltage of +2 pu at the fourth bus 234 of the leg 201 of the power converter, during the first state 802, the switches $S_1$, $S_2$, $S_3$, and $S_4$ are deactivated, thereby providing a current traverse path 806. In the current traverse path 806, the current flows from the fourth bus 234 to the first DC bus 214, while traversing the anti-parallel diode corresponding to switch $S_3$, the second node 230, and the upper diodes $D_3$, $D_2$, and $D_1$ of the first portion 226 of the first string 202. Therefore, the voltage across the capacitors $C_3$ and $C_4$ that have been charged cumulatively to 2 pu during the initial state of the leg 201 of the power converter appears at the fourth bus 234. Consequently, a voltage of +2 pu may be generated at the fourth bus 234.

Furthermore, it may be desirable to generate a voltage of +1 pu at the fourth bus 234. The generation of the voltage of +1 pu may be as achieved during a second state and a third state of the leg 201 of the power converter. In one example, a voltage of +1 pu may be generated at the fourth bus 234 when the capacitor $C_1$ is discharging and is diagrammatically represented in FIG. 9. Also, in another example, a voltage of +1 pu may be generated at the fourth bus 234 when the capacitor $C_1$ is charging and is diagrammatically represented in FIG. 10.

Figure 9:
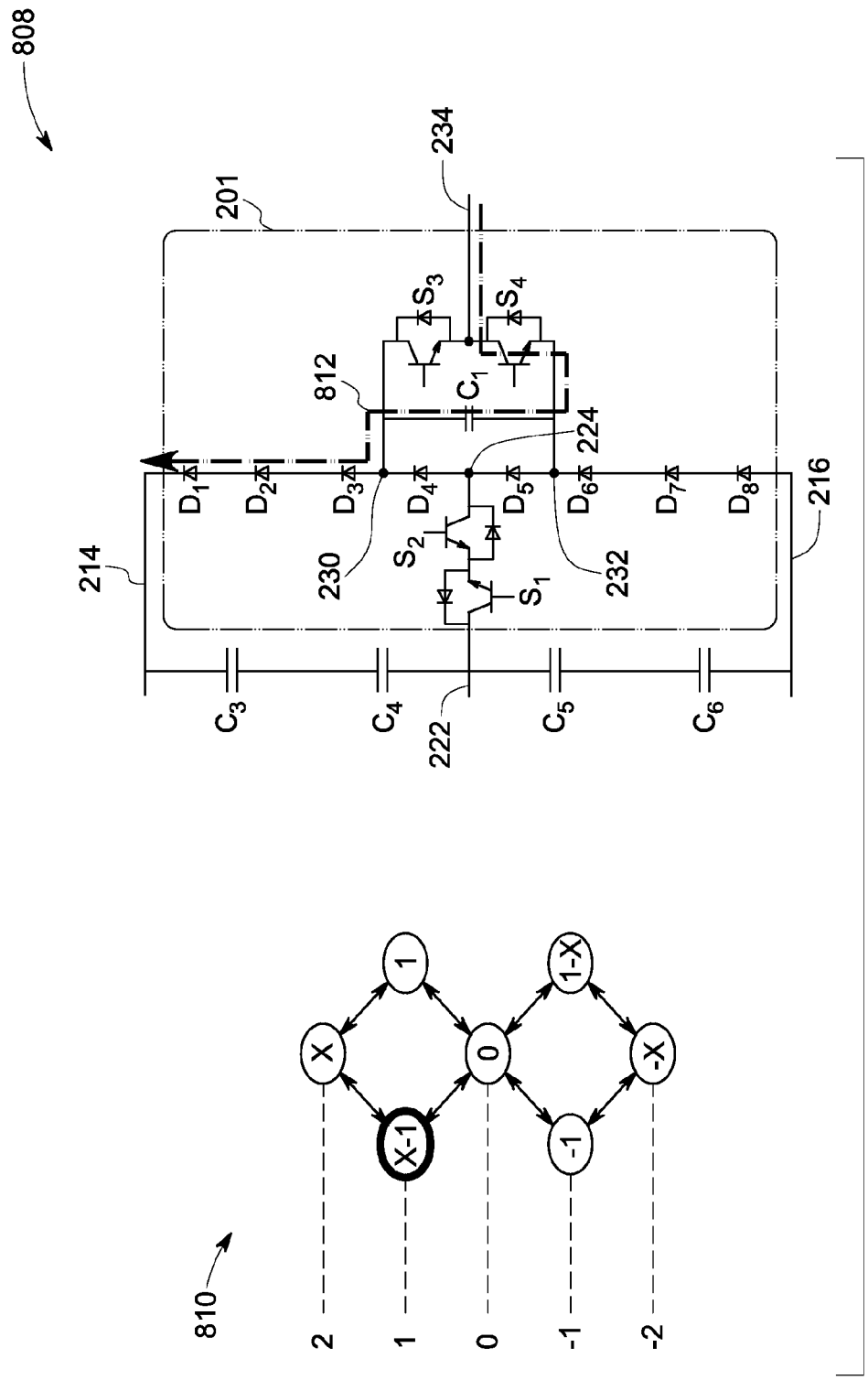

Referring now to FIG. 9, reference numeral 808 is representative of a second state of the legs of the power converter such as the leg 201 of FIG. 2. More particularly, reference numeral 808 is representative of the second state of generation of a voltage of +1 pu at the fourth bus 234. Also, reference numeral 810 represents a state diagram corresponding to the second state of the leg, where an 'x-1' state of the state diagram 810 is indicative of the generation of a voltage of +1 pu at the fourth bus 234, when the capacitor $C_1$ is in a charged condition. To that end, the fully controllable semiconductor switch $S_4$ is activated, thereby providing a current traverse path 812. In particular, in the current traverse path 812, the current flows from the fourth bus 234 to the first DC bus 214 traversing the activated switch $S_4$, the flying capacitor $C_1$ 212, the second node 230, and the upper diodes ($D_3$, $D_2$ and $D_1$) of the portion 226. Accordingly, a voltage, representative of a difference between the voltage across the DC link capacitors $C_3$ and $C_4$ and the voltage across the flying capacitor 212 ($C_1$) may appear at the fourth bus 234. As previously noted, the voltage across the upper DC link that includes the capacitors $C_3$ and $C_4$ is 2 pu and the voltage across the capacitor $C_1$ is 1 pu, based on the initial pre-charging of the capacitors C1, C3, and C4. Accordingly, in the second state a voltage of +1 pu may be generated at the fourth bus 234. The activation and deactivation of the fully controllable semiconductor switches $S_1$, $S_2$, $S_3$, and $S_4$ may be achieved by selectively switching the fully controllable semiconductor switches $S_1$, $S_2$, $S_3$, and $S_4$.

Subsequently, the flying capacitor $C_1$ may be discharged. It may be desirable to generate a voltage of +1 pu at the fourth bus 234 in a subsequent switching cycle. This subsequent switching cycle may be in the same positive current cycle or in a subsequent positive current cycle. The term subsequent positive current cycle, as used herein, is used to refer to another cycle in which the AC current may again be positive. Also, the next positive current cycle may repeat at a frequency of 50 Hz or 60 Hz, based on the frequency of the AC current.

Figure 10:
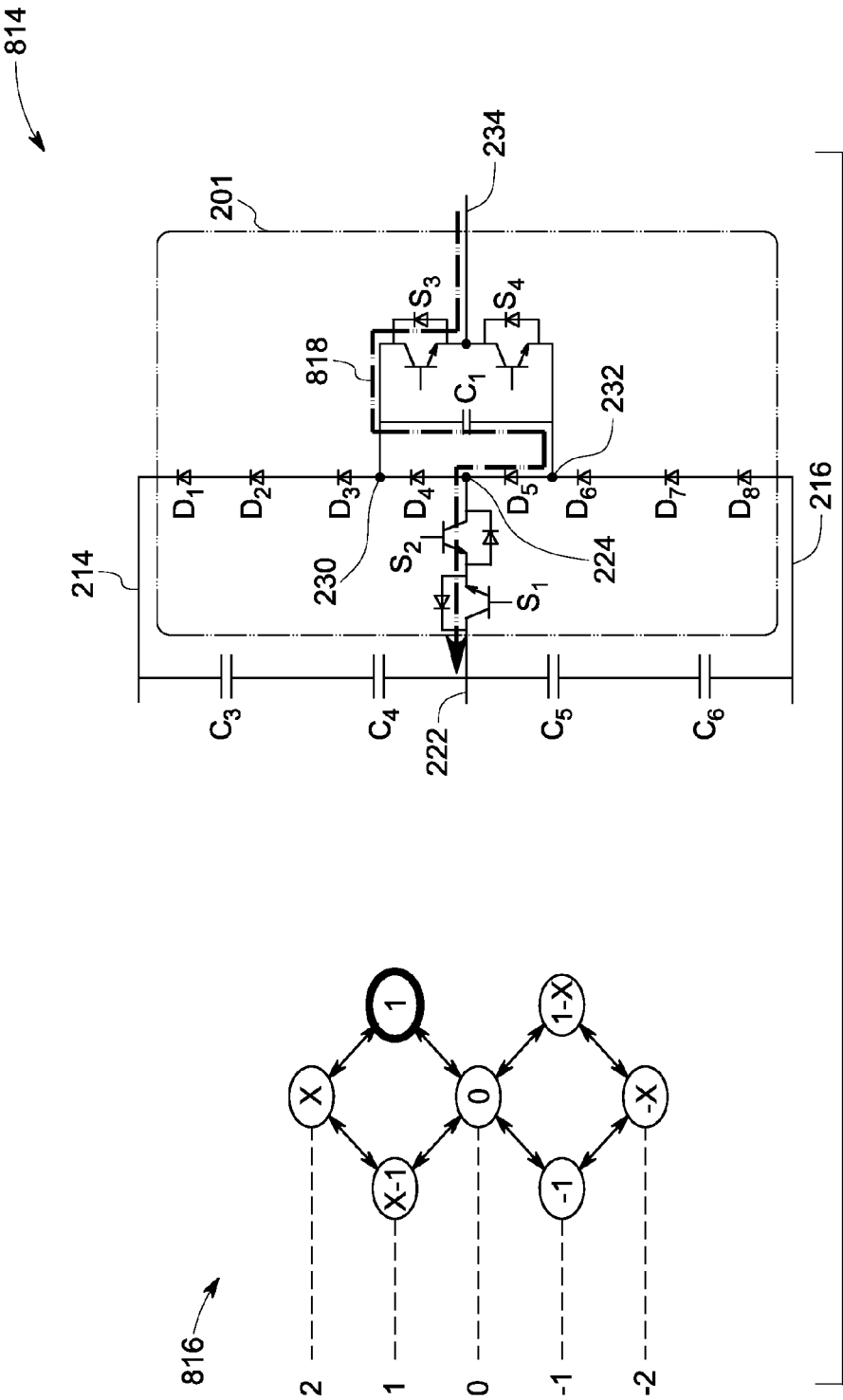

Turning now to FIG. 10, reference numeral 814 is representative of a diagrammatical representation of a third state of the legs of the power converter such as the leg 201 of FIG. 2. In particular, reference numeral 814 may be representative of a third state of generation of a voltage of +1 pu at the fourth bus 234. During the third state, the capacitor $C_1$ that was discharged during the second state may be charged. Reference numeral 816 represents a state diagram corresponding to the third state of the leg for generating a voltage of +1 pu at the fourth bus 234. In particular, as depicted in FIG. 10, the fully controllable semiconductor switch $S_2$ may be activated, thereby providing a current traverse path 818. The current flows from the fourth bus 234 to the third bus 222, while passing through the antiparallel diode corresponding to switch $S_3$, the capacitor 212 ($C_1$), the third node 232, upper diode $D_5$ of the second portion 228, the first node 224, the activated switch $S_2$, and the antiparallel diode corresponding to the switch $S_1$. Consequently, the flying capacitor $C_1$ 212 may be charged to 1 pu. The voltage at the fourth bus 234 is representative of a sum of the voltage at the middle DC bus 222 and the voltage to which the flying capacitor $C_1$ is charged. As previously noted, the voltage at the middle DC bus 222 is 0 pu. Consequently, the voltage at the fourth bus 234 is +1 pu. During the operation of the leg 201 of the power converter, the embodiment of FIG. 9 may be alternatively employed along with the embodiment of FIG. 10 to maintain the flying capacitor $C_1$ at a voltage that is substantially equal to 1 pu.

Figure 11:
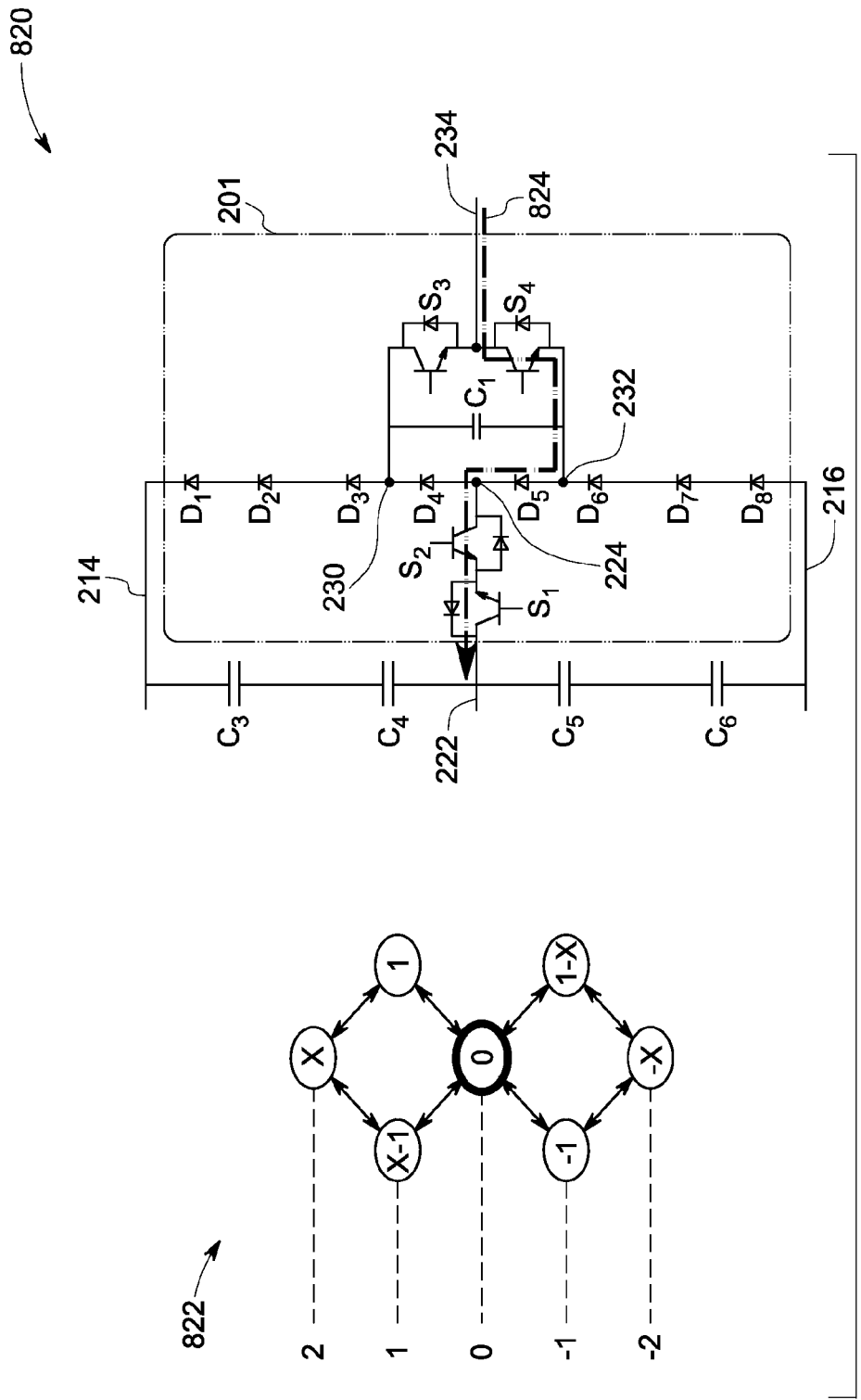

Moreover, FIG. 11 is a diagrammatic representation 820 of a fourth state of the leg 201 of the power converter to generate 0 pu at the fourth bus 234 of the leg of the power converter. Reference numeral 822 is representative of a state diagram corresponding to the fourth state 820 of the leg 201 of the power converter. By way of example, the state '0' in the state diagram 822 corresponding to the third state 820 indicates a voltage level of 0 pu. Therefore, for obtaining a voltage of 0 pu at the fourth bus 234 of the leg 201, the fully controllable semiconductor switches $S_2$ and $S_4$ may be activated. Accordingly, the activated fully controllable semiconductor switches $S_2$ and $S_4$ provide a current traverse path 824. In particular, in the current traverse path 824, the current flows from the fourth bus 234 to the third bus 222, while traversing the activated switch $S_4$, the third node 232, diode $D_5$ of the second portion 228, the first node 224, the activated switch $S_2$, and the antiparallel diode corresponding to the switch $S_1$. Accordingly, the voltage at the fourth bus 234 may be equivalent to the voltage at the third bus 222 that is 0 pu. Consequently, a voltage of 0 pu is obtained at the fourth bus 234.

Similarly, voltage levels −2 pu and −1 pu may be generated at the fourth bus 234 for negative AC currents. The term negative AC currents, as used herein, may be representative of a negative cycle of the AC current which may recur every half cycle. Also, the direction of the negative current may be from the leg 201 to the fourth bus 234.

Although, the example of FIGS. 2 and 8-11 describe the generation of a five level voltage at the fourth bus 234, generation of different levels of voltages such as a six level voltage, a seven level voltage, and other equivalent multilevel voltages is also contemplated. As noted hereinabove, different levels of voltages may be generated by activating and deactivating the fully controllable semiconductor switches. More particularly, selective switching of the fully controllable semiconductor switches may result in generation of different levels of voltages, such as, but not limited to, the five level voltage, the six level voltage, and other equivalent multilevel voltages. It may be noted that the five level voltage, the six level voltage, the seven level voltage, and other equivalent multilevel voltage generated at the fourth bus may be referred to as a second line parameter. Moreover, although, FIGS. 8-11 represent generation of a five level voltage using the leg 201 represented in FIG. 2, the five level voltage may also be similarly generated at the fourth bus of the legs 501, 601 of FIGS. 5 and 6.

As previously noted, the levels in the five level voltage may include +2 pu, +1 pu, 0 pu, −1 pu and −2 pu. It may be assumed that each of the flying capacitors $C_1$ and $C_2$ and each of the DC link capacitors $C_3$, $C_4$, $C_5$, and $C_6$ are pre-charged to 1 pu, to generate the five level voltage using the leg 501 of FIG. 5. Also, when a positive current flows from the fourth bus 529 to the leg 501, a non-negative voltage is generated at the fourth bus 529. Furthermore, for generating the five levels of voltage employing the leg 501, the leg 501 may traverse through nine states. Only four states of the nine states, such as a first state, a second state, a third state, and a fourth state of leg 501 are described hereinafter.

During the first state the fully controllable semiconductor switches $S_5$, $S_6$, $S_7$, and $S_8$ may be deactivated. Hence, the positive AC current traverses from the fourth bus 529 via the first portion 526 of the first string 502 to the positive DC bus 514. Therefore, the voltage across the capacitors $C_3$ and $C_4$ that have been charged cumulatively to 2 pu during the initial state of the leg 501 of the power converter appears at the fourth bus 529. Consequently, the voltage at the fourth bus 529 is +2 pu.

Furthermore, it may be desirable to generate a voltage of +1 pu at the fourth bus 529. The generation of the voltage of +1 pu may be occur during a second state and a third state of the leg 501 of the power converter. During the second state of the leg 501, a voltage of +1 pu may be generated at the fourth bus 529 when the capacitor $C_1$ is discharging. Also, during a third state of the leg 501, a voltage of +1 pu may be generated at the fourth bus 529 when the capacitor $C_1$ is charging.

In the second state of the leg 501, the fully controllable semiconductor switch $S_8$ may be activated. Hence, the current from the fourth bus 529 passes through the activated fully controllable semiconductor switch $S_8$, the diode that is antiparallel to the switch $S_7$, the flying capacitor $C_1$ and the top two power diodes $D_1$ and $D_2$ of the first portion 526 of the first string 502. As previously noted, the voltage across the upper DC link capacitors $C_3$ and $C_4$ is 2 pu and the voltage across the capacitor $C_1$ is 1 pu based on the initial pre-charging of the capacitors. Therefore, the voltage at the fourth bus 529 is representative of a difference between the voltage across the upper DC link capacitors $C_3$, $C_4$ and the voltage across the capacitor $C_1$. Accordingly, the voltage at the fourth bus 229 is 1 pu. Subsequently, the flying capacitor $C_1$ may be discharged.

The third state of the leg 501 may be representative of an alternative method for generating a voltage of +1 pu at the fourth bus 529. During the third state of the leg 501, the fully controllable semiconductor switch $S_6$ may be activated. Hence, the current flows from the fourth bus 529 to the middle DC bus 522 while traversing through the flying capacitor $C_1$, the activated fully controllable semiconductor switch $S_6$, and the antiparallel diode corresponding to the switch $S_5$. Consequently, the flying capacitor $C_1$ may be charged to 1 pu. Hence, the voltage at the fourth bus 529 may be representative of a sum of the voltage at the middle DC bus 522 and the voltage to which the flying capacitor $C_1$ is charged. As previously noted, the voltage at the middle DC bus 222 is 0 pu. Consequently, the voltage at the fourth bus 529 is +1 pu.

Also, in the fourth state of the leg 501, the fully controllable semiconductor switches $S_6$ and $S_8$ may be activated. Accordingly, the activated fully controllable semiconductor switches $S_6$ and $S_8$ provide a current traverse path, where the current flows from the fourth bus 529 to the middle bus 522 while traversing through the activated switch $S_5$, the antiparallel diode of switch $S_7$, the activated switch $S_6$, and the antiparallel diode of switch $S_5$. Accordingly, the voltage at the fourth bus 529 may be equivalent to the voltage at the middle DC bus 522, that is 0 pu. Similarly, voltage levels −2 pu and −1 pu may be generated at the fourth bus 529 for negative AC currents.

Furthermore, to generate the five level voltage employing the leg 601 of FIG. 6, it may be assumed that the flying capacitor $C_1$ 612 and each of the DC link capacitors $C_3$, $C_4$, $C_5$, and $C_6$ are pre-charged to 1 pu. Also, when a positive current flows from the fourth bus 638 to the leg 601, a non-negative voltage is generated at the fourth bus 638. Also, the leg 601 may traverse through seven states to generate five levels of voltage. Only four states of the seven states, such as a first state, a second state, a third state, and a fourth state of leg 601 are described hereinafter.

During the first state of the leg 601, the fully controllable semiconductor switches $S_9$, $S_{10}$, $S_{11}$, and $S_{12}$ may be deactivated. Hence, the positive current flowing from the fourth bus 638 traverses through an antiparallel diode corresponding to the switch $S_{10}$, an antiparallel diode corresponding to the switch $S_9$, the fourth node 634, two upper diodes $D_1$ and $D_2$ in the first portion 626, and subsequently to the first bus 614. Consequently, a voltage of value +2 pu is generated at the fourth bus 638.

In the second state of the leg 601, the switch $S_{11}$ may be activated causing the current from the fourth bus 638 to flow to the first bus 614 via the activated switch $S_{11}$, the third node 632, the flying capacitor $C_1$ 612, the second node 630, the antiparallel diode corresponding to the switch $S_9$, the fourth node 634, and the two upper diodes $D_1$, $D_2$ in the first portion 626. Hence, a voltage, which is representative of a difference between the voltage across the upper DC link capacitors $C_3$ and $C_4$ and the initial voltage across the flying capacitor $C_1$ 612 may be generated at the fourth bus 638. Accordingly, a voltage of +1 pu is generated at the fourth bus 638. Subsequently, the flying capacitor $C_1$ 612 may be discharged.

Additionally, the third state of the leg 601 may be representative of an alternative method for generating a voltage of +1 pu at the fourth bus 638. During the third state of the leg 601, the switch $S_{12}$ may be activated. Therefore, a positive current from the fourth bus 638 flows to the third bus 622 while traversing the antiparallel diode corresponding to the switch $S_{10}$, the second node 630, the flying capacitor $C_1$ 612, the third node 632, the activated switch $S_{12}$, and the two upper diodes $D_5$ and $D_6$ of the second portion 628. Consequently, the flying capacitor $C_1$ 612 may be charged to 1 pu and a voltage of +1 pu may be generated at the fourth bus 638.

Also, in the fourth state of the leg 601, the switches $S_{11}$ and $S_{12}$ may be activated. Accordingly, a current from the fourth bus 638 flows to the third bus 622, while traversing through the activated switch $S_{11}$, the third node 632, the activated switch $S_{12}$, the fifth node 636, and the two upper diodes $D_5$ and $D_6$ of the second portion 628. As previously noted, the voltage at the third bus 622 is 0 pu. Consequently, a voltage of 0 pu is obtained at the fourth bus 638. Similarly, for a negative current, voltages −2 pu, −1 pu, and 0 pu may be generated at the fourth bus 638.

Furthermore, in FIG. 7, seven levels of voltage may be generated at the fourth bus 730 by selectively activating and/or deactivating the fully controllable semiconductor switches in the second string 704. In one example, the levels in the seven level voltage may include +3 pu, +2 pu, +1 pu, 0 pu, −1 pu, −2 pu and −3 pu. For a positive current, voltage levels +3 pu, +2 pu, +1 pu and 0 pu may be generated at the fourth bus 730. Furthermore, voltage levels of +2 pu and +1 pu may be generated based on different charging and discharging options for the flying capacitors $C_7$ and $C_8$. Similarly, for negative currents, voltages −3 pu, −2 pu, −1 pu, and 0 pu may be generated at the fourth bus 730.

Figure 12:
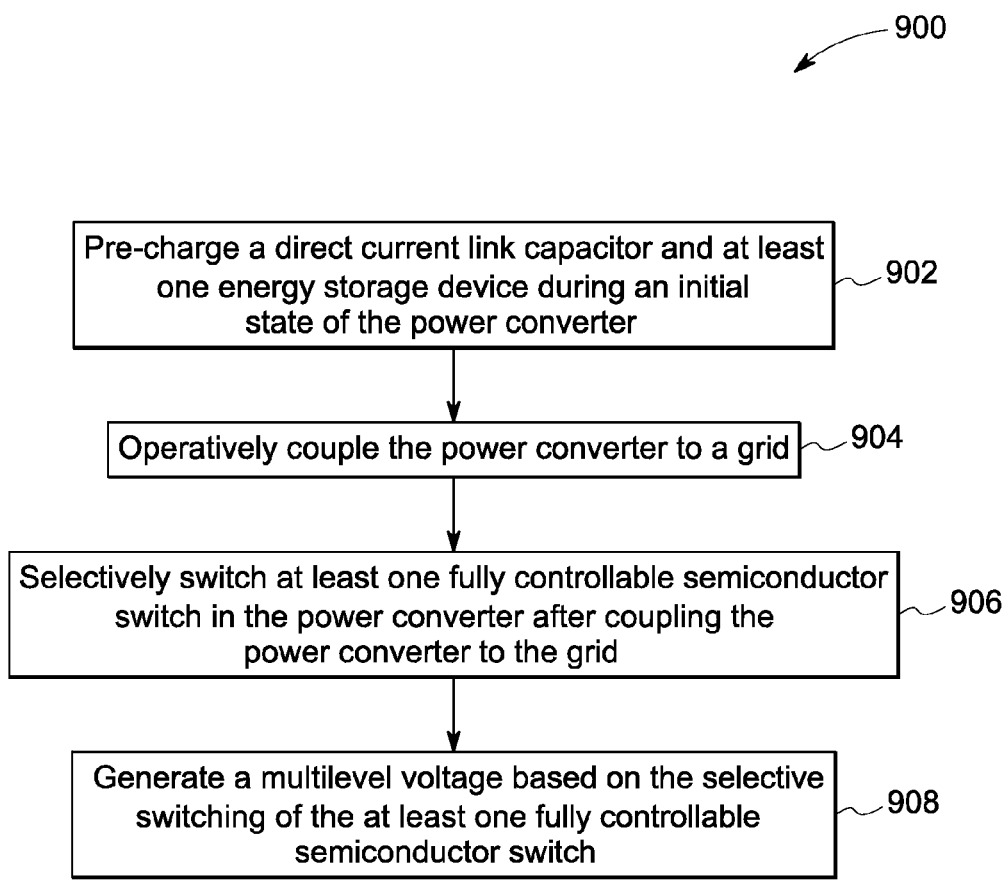
FIG. 12 is a flow chart representing an exemplary method for power conversion, according to aspects of the present disclosure.

Referring now to FIG. 12, a flow chart 900 representing a method for power conversion, according to aspects of the present disclosure, is depicted. For ease of understanding, the method of FIG. 12 will be described with respect to FIGS. 1, 2, 3-4, and 8-11. The method begins at step 902, where a flying capacitor $C_1$ of the three legs of the power converter and the DC link capacitors ($C_3$, $C_4$, $C_5$, and $C_6$) may be pre-charged during an initial state of the power converter, such as the second power converter 108 of FIG. 1. As noted hereinabove, prior to the initial state of the power converter, the flying capacitor $C_1$ and the DC link capacitors $C_3$, $C_4$, $C_5$, and $C_6$ are in a discharged condition. Hence, prior to the initial state, the voltage across the flying capacitor $C_1$ and the DC link capacitors $C_3$, $C_4$, $C_5$, and $C_6$ is zero volt. Subsequent to the pre-charging during the first stage 300 and second stage 350, the flying capacitor $C_1$ and each of the DC link capacitors $C_3$, $C_4$, $C_5$, and $C_6$ may be charged to 1 pu.

Furthermore, at step 904, the power converter may be operatively coupled to a grid. Once the power converter is coupled to grid, a first line parameter may be introduced to the power converter.

After coupling of the power converter to the grid, based on the AC current, at least one of the fully controllable semiconductor switches $S_1$, $S_2$, $S_3$, $S_4$ in the one or more second strings 204, 205 may be selectively switched, as indicated by step 906. The selective switching may include activating and/or deactivating of the fully controllable semiconductor switches.

At step 908, based on the selective switching of the at least one fully controllable semiconductor switch $S_1$, $S_2$, $S_3$, $S_4$, a multilevel voltage may be generated. In one example, the multilevel voltage may include five level voltage. The multilevel voltage generated at the fourth bus 234 may be referred to as a second line parameter. By way of example, the five level voltage may include voltages +2 pu, +1 pu, 0 pu, −1 pu, and −2 pu. Furthermore, the five level voltage may be generated at the fourth bus 234 of FIG. 2. As previously noted, the fourth bus 234 may include an AC phase. Also, the AC phases may form the AC terminal of the power converter. In one embodiment, the first line parameter and the second line parameter may include a DC voltage, an AC voltage, an AC current, a DC current, or combinations thereof.

Furthermore, the foregoing examples, demonstrations, and process steps such as those that may be performed by the system may be implemented by suitable code on a processor-based system, such as a general-purpose or special-purpose computer. It should also be noted that different implementations of the present disclosure may perform some or all of the steps described herein in different orders or substantially concurrently, that is, in parallel. Furthermore, the functions may be implemented in a variety of programming languages, including but not limited to C, C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the power converter and the methods for power conversion described hereinabove aid in developing multilevel power converters, thereby allowing generation of a high power/voltage/current output. Furthermore, since the exemplary power converter utilizes a reduced count of fully controllable semiconductor switches when compared to conventional power converters, a low cost power converter may be provided. Moreover, the exemplary power converter circumvents the need for transformers, thereby reducing the size and complexity of the power converter. Also, the power converter aids in generating enhanced quality waveform without the use of filters. The power converter described hereinabove may find application in variable frequency drives (VFD). In addition, the power converter may be used in high voltage direct current (HVDC) systems where the direction of power flow may be unidirectional, such as in offshore wind farm at the wind farm side and in subsea power transmissions at a grid side.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A power converter, comprising:
at least one leg operatively coupled between a first bus and a second bus, wherein the at least one leg comprises:
a first string comprising a plurality of non-controllable semiconductor switches, a first node, a second node, and a third node, wherein the first node is coupled to a third bus;
one or more second strings, wherein each of the one or more second strings comprises at least one fully controllable semiconductor switch, and wherein one of the second strings is operatively coupled between the first node and the third bus and another second string is operatively coupled between the second node and the third node; and
one or more third strings, wherein each of the one or more third strings comprises at least one energy storage device, wherein each of the one or more third strings is operatively coupled to the first string, the one or more second strings, or a combination thereof, and
wherein the at least one fully controllable semiconductor switch of the one or more second strings is configured to be selectively switched to provide a current traverse path through the first string, the one or more second strings, the one or more third strings, and a direct current link.

2. The power converter of claim 1, wherein the at least one fully controllable semiconductor switch comprises an insulated gate bipolar transistor, a metal oxide semiconductor field effect transistor, a field effect transistor, an injection enhanced gate transistor, an integrated gate commutated thyristor, or combinations thereof.

3. The power converter of claim 1, wherein the at least one fully controllable semiconductor switch comprises a gallium arsenide based switch, a gallium nitride based switch, a silicon carbide based switch, or combinations thereof.

4. The power converter of claim 1, wherein the plurality of non-controllable semiconductor switches comprises power diodes.

5. The power converter of claim 1, wherein the first bus comprises a positive direct current bus and the second bus comprises a negative direct current bus.

6. The power converter of claim 1, wherein the first string comprises a first portion operatively coupled to a second portion via the first node and the first string is operatively coupled between the first bus and the second bus.

7. The power converter of claim 1, further comprising a fourth bus operatively coupled to the first string, the one or more second strings, or both the first string and the one or more second strings.

8. The power converter of claim 7, wherein the fourth bus comprises at least one alternating current phase.

9. The power converter of claim 1, wherein the at least one energy storage device comprises a capacitor.

10. A system for power conversion, comprising:
a first power converter;
a direct current link operatively coupled to the first power converter and comprising one or more direct current link capacitors operatively coupled in series;
a second power converter operatively coupled to the first power converter via a first bus and a second bus, wherein the second power converter comprises:
at least one leg operatively coupled between the first bus and the second bus, wherein the at least one leg comprises:
a first string consisting of a plurality of non-controllable semiconductor switches;
one or more second strings, wherein each of the one or more second strings comprises at least one fully controllable semiconductor switch;
one or more third strings, wherein each of the one or more third strings comprises at least one energy storage device, and wherein each of the one or more third strings is operatively coupled to the first string, the one or more second strings, or a combination thereof; and
a pre-charging unit configured to charge the at least one energy storage device in the one or more third strings and the one or more direct current link capacitors in the direct current link.

11. The system of claim 10, wherein the first power converter comprises a plurality of fully controllable semiconductor switches.

12. The system of claim 10, wherein the first power converter comprises an alternating current to direct current converter, a direct current to alternating current converter, or a combination thereof, and the second power converter comprises an alternating current to direct current converter.

13. The system of claim 10, wherein the second power converter comprises a multilevel power converter.

14. The system of claim 10, wherein the pre-charging unit comprises an auxiliary three phase power source.

15. The system of claim 10, further comprising a controller configured to control switching of the at least one fully controllable semiconductor switch of the one or more second strings.

16. The system of claim 15, wherein the controller is configured to:
   selectively switch the at least one fully controllable semiconductor switch in the one or more second strings of the power converter; and
   generate a multilevel voltage based on the selective switching of the at least one fully controllable semiconductor switch.

17. The system of claim 15, wherein the controller is configured to:
   activate the at least one fully controllable semiconductor switch in the one or more second strings of the power converter to charge the one or more direct current link capacitors and the at least one energy storage device to a first determined value of a direct current link voltage; and
   deactivate the at least one activated fully controllable semiconductor switch to charge the one or more direct current link capacitors to a second determined value of the direct current link voltage.

18. A method for power conversion, comprising:
   pre-charging a direct current link capacitor and at least one energy storage device of a power converter during an initial state of the power converter, wherein the power converter comprises:
      at least one leg operatively coupled between a first bus and a second bus, wherein the at least one leg comprises:
         a first string comprising a plurality of non-controllable semiconductor switches, a first node, a second node, and a third node, wherein the first node is coupled to a third bus;
         one or more second strings, wherein each of the one or more second strings comprises at least one fully controllable semiconductor switch, and wherein one of the second strings is operatively coupled between the first node and the third bus and another second string is operatively coupled between the second node and the third node;
         one or more third strings, wherein each of the one or more third strings comprises the at least one energy storage device, and wherein each of the one or more third strings is operatively coupled to the first string, the one or more second strings, or a combination thereof;
   operatively coupling the power converter to a grid;
   selectively switching the at least one fully controllable semiconductor switch in the one or more second strings of the power converter; and
   generating a multilevel voltage based on the selective switching of the at least one fully controllable semiconductor switch.

19. The method of claim 18, wherein pre-charging the direct current link capacitor and the at least one energy storage device of the power converter comprises:
   activating the at least one fully controllable semiconductor switch in the one or more second strings of the power converter to charge the direct current link capacitor and the at least one energy storage device to a first determined value of a direct current link voltage; and
   deactivating the activated at least one fully controllable semiconductor switch to charge the direct current link capacitor to a second determined value of the direct current link voltage.

20. The method of claim 18, wherein generating the multilevel voltage comprises providing a current traverse path via one or more of the first string, the one or more second strings, and the one or more third strings, based on the selective switching of the at least one fully controllable semiconductor switch.

21. The method of claim 20, wherein generating the multilevel voltage comprises charging the at least one energy storage device, discharging the at least one energy storage device, or a combination thereof.

* * * * *